United States Patent [19]

Zou et al.

[11] Patent Number: 5,800,601
[45] Date of Patent: Sep. 1, 1998

[54] FOOD GRADE JET INKS

[75] Inventors: Wan Kang Zou, Northbrook; Mohammed W. Siddiqui, Carol Stream; Fengfei Xiao, Mount Prospect; Arsenia C. Morelos, Glendale Heights; Jose G. Vega, Chicago; Qiao Qiao Dong, Northbrook; Josephine Aguilar, Elk Grove Village, all of Ill.

[73] Assignee: Videojet Systems International, Inc., Wood Dale, Ill.

[21] Appl. No.: 814,987

[22] Filed: Mar. 14, 1997

Related U.S. Application Data

[63] Continuation-in-part of Ser. No. 554,296, Nov. 6, 1995, abandoned, Ser. No. 554,298, Nov. 6, 1995, abandoned, Ser. No. 622,954, Mar. 27, 1996, abandoned, and Ser. No. 623,902, Mar. 27, 1996, abandoned.

[51] Int. Cl.$^6$ .................... C09D 11/02; C09D 11/08
[52] U.S. Cl. .................... 106/31.65; 106/31.69; 106/31.73; 106/31.74; 106/31.86; 106/31.9
[58] Field of Search ................ 106/31.65, 31.73, 106/31.74, 31.69, 31.86, 31.9

[56] References Cited

U.S. PATENT DOCUMENTS

| | | | |
|---|---|---|---|
| Re. 34,145 | 12/1992 | Martin | 523/205 |
| 2,846,332 | 8/1958 | Nesty | 106/448 |
| 3,390,049 | 6/1968 | Rednick et al. | 106/218 |
| 3,420,931 | 1/1969 | Daum et al. | 424/479 |
| 3,524,756 | 8/1970 | Signorino et al. | 424/479 |
| 3,552,995 | 1/1971 | Powell | 106/437 |
| 3,738,952 | 6/1973 | Signorino et al. | 424/481 |
| 3,884,871 | 5/1975 | Herman et al. | 427/221 |
| 3,935,326 | 1/1976 | Groppenbacher et al. | 424/482 |
| 3,957,966 | 5/1976 | Valan | 424/482 |
| 4,168,622 | 9/1979 | Fell | 73/49.5 |
| 4,199,370 | 4/1980 | Brand | 106/446 |
| 4,293,625 | 10/1981 | Myers | 430/9 |
| 4,693,751 | 9/1987 | Den Boer et al. | 106/205.9 |
| 4,720,378 | 1/1988 | Forse et al. | 424/10.2 |
| 4,832,944 | 5/1989 | Socci et al. | 106/414 |
| 5,282,893 | 2/1994 | Komiya | 106/447 |
| 5,397,387 | 3/1995 | Deng et al. | 106/31.37 |
| 5,407,474 | 4/1995 | Airey et al. | 106/31.65 |
| 5,453,122 | 9/1995 | Lyon | 106/31.37 |
| 5,637,139 | 6/1997 | Morelos et al. | 106/31.37 |

FOREIGN PATENT DOCUMENTS

| | | |
|---|---|---|
| 226 671 B1 | 3/1991 | European Pat. Off. |
| 0 475 075 A1 | 8/1991 | European Pat. Off. |
| 52-146307 | 12/1977 | Japan |
| 54-006606 | 1/1979 | Japan |
| 0 006 606 | 11/1979 | Japan |
| 59-230071 | 12/1984 | Japan |
| 1031878 | 2/1989 | Japan |
| 03083559 | 4/1991 | Japan |
| 6073321 | 3/1994 | Japan |
| 662 358 | 9/1987 | Switzerland |
| 2 277 094 | 10/1994 | United Kingdom |
| WO 95/01404 | 1/1995 | WIPO |

OTHER PUBLICATIONS

Kampfer, W.A., "Titanium Dioxide", *Pigment Handbook*, vol. III, pp. 1–36 (1973), no month.
Ritter, H.S., "Surface Properties of Titanium Dioxide Pigments", *Pigment Handbook*, vol. III, pp. 169–184 (1973), no month.

*Primary Examiner*—Helene Klemanski
*Attorney, Agent, or Firm*—Leydig, Voit & Mayer, Ltd.

[57] ABSTRACT

The present invention provides jet ink compositions that are free or substantially free of sedimentation, have good image adhesion and rub resistance, and that are suitable for printing messages on food items such as fruits, vegetables, chocolate, candies, confectioneries and pharmaceuticals such as tablets, and other edible or ingestible materials. The jet ink compositions comprise a surface modified or coated colorant. The surface modified or coated food grade colorant comprises a food grade colorant of particle size in the range of from about 0.01 micron to about 25 microns, a colorant carrier, and a surface modifying or coating agent. The surface modifying or coating agent comprises at least one binder resin, and preferably two or more binder resins.

32 Claims, No Drawings

5,800,601

1

FOOD GRADE JET INKS

CROSS-REFERENCE TO RELATED APPLICATIONS

This is a continuation-in-part application of U.S. patent application Ser. Nos. 08/554,296 and 08/554,298, both filed Nov. 6, 1995, both now abandoned and U.S. patent application Ser. Nos. 08/622,954 and 08/623,902, both filed Mar. 27, 1996, both now abandoned the disclosures of which are incorporated herein in their entirety by reference.

FIELD OF THE INVENTION

The present invention relates to jet ink compositions in general, and to food grade jet ink compositions in particular. The jet ink compositions of the present invention are suitable for jet printing on food and pharmaceutical articles such as fruits, vegetables, candies, and tablets.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream so that the droplets are caused to form the desired printed message on that surface. In the continuous ink jet printing system, the direction of the stream is controlled electronically.

Reviews of various aspects of ink jet printing can be found in these publications: Kuhn et al., *Scientific American*, April, 1979, 162–178; and Keeling, *Phys. Technol.*, 12(5), 196–303 (1981). Various ink jet apparatuses are described in the following U.S. Pat. Nos.: 3,060,429, 3,298,030, 3,373,437, 3,416,153, and 3,673,601.

In recent years there has been significant developmental activity in the area of ink compositions suitable for ink jet printing, and several jet ink compositions are known. See for example, U.S. Pat. Nos. 4,155,768, 4,197,135, 4,680,332, 4,692,188, and 5,254,158.

In general, a jet ink composition must meet certain rigid requirements to be useful in ink jet printing operations. These relate to viscosity, resistivity, solubility, compatibility of components and wettability of the substrate. Further, the jet ink must be quick-drying and smear resistant, resist rubbing, and be capable of passing through the jet nozzle without clogging or drying, and permit rapid cleanup of the machine components with minimum effort.

The technique of jet ink printing or non-contact printing is particularly well suited for application of characters onto food and pharmaceutical articles, including, for example, tablets, pills, pellets, suppositories, confectioneries, and candies. The jet printing method is considered superior to impact printing methods such as stamping which tends to damage the articles. Presently, marking of information on food items such as fruits and vegetables is commonly done by the use of direct contact printing or labeling with stickers. Both techniques present certain difficulties. Good print quality using direct contact printing is difficult to achieve when printing on nonuniform, irregular surfaces, as are presented when one attempts to print on fruits and vegetables such as oranges, apples, grapefruits, and the like. Placing labels on such fruits and vegetables can be difficult for the same reasons, and it further requires the consumer to remove the label before consuming the food item.

It is often useful and desirable to place on food items information that can be varied readily. One example of such a need exists in the case of fruits or vegetables, that is, the desire by suppliers to mark the fruit or vegetable with a "Price Look-Up" (PLU) Code. This PLU code is important at the retail level for entering the proper price, for instance, based on fruit size. A quick and easy manner of placing such information on food items is presently desired. Also desirable for brand recognition is the ability to place images on the food item, as by printing a corporate logo or the like.

A problem associated with the direct marking of food items, such as fruit, however, is that the information on the fruit must remain readable under a variety of conditions and must be stable, even in the presence of moisture. Because packaged or boxed fruit is often subjected to changing temperature and humidity conditions during storage, transport, and display at the supermarket, the surface of the fruit can develop condensation or moisture. The printed information on the surface of the fruit should remain readable even under such temperature and humidity extremes and sudden changes therein. The printed image should not bleed, disappear, fade, or transfer to other food items placed in contact therewith, under any of the conditions and environmental changes that the fruit may encounter.

Ink jet printing would offer the advantages of increased marking speed and the opportunity to put variable information on food items such as fruits and vegetables.

Jet ink compositions suitable for printing on food items have been also disclosed. For example, U.S. Pat. No. 5,397,387 discloses a jet ink composition for use in jet printing on food items, especially fruits and vegetables, and a method of forming printed images on such food items by use of such compositions. The composition comprises a binder resin such as a rosin resin, a colorant such as FD&C Blue #1, and a carrier such as ethanol which is free of methyl ethyl ketone.

Japanese Patent 54006606 discloses a jet ink composition comprising an edible coloring agent such as Red #2, a solvent such as water, ethyl alcohol, glycerin, or propylene glycol, and optionally an edible resin such as an ester gum.

Japanese Patent 59230071 discloses a jet ink composition suitable for jet printing on foods such as fruit and egg, comprising a solubilized shellac, a food grade water soluble dyestuff, and water.

Japanese Patent 52146307 discloses a jet ink composition containing shellac, a food color, a resistance controlling agent, and a mixed solvent consisting of water, lower alcohol, and methyl cellosolve.

U.S. Pat. No. 5,453,122 discloses an edible jet ink containing a dyestuff, acetone, and at least one other solvent selected from water, an alkanol, and an alkyl ester of an alkyl carboxylic acid.

Swiss Patent 662358 discloses a jet ink suitable for printing on foodstuffs such as fruit, egg, and confectionery, comprising a food grade dye, a film-former, and a glycol or glycol ether solvent or mixed solvent of the formula $R_1$—$CHR_2$—$CH_2$—$R_3$, wherein $R_1$ is hydrogen or methyl, $R_2$ is hydroxy, methoxy, or ethoxy, and $R_3$ is hydroxy, methoxy, or ethoxy.

U.S. patent application Ser. No. 08/317,339, filed Oct. 4, 1994, now abandoned discloses certain jet ink compositions suitable for ink jet printing on food items comprising water, a colorant, and a binder resin. The ink composition is prepared by mixing together the water, a binder resin such as shellac or polyvinylpyrrolidone, a colorant such as titanium dioxide, and other additives such as humectants and pH adjusting agents.

U.S. patent application Ser. No. 08/614,751, filed Mar. 13, 1996, now U.S. Pat. No. 5,637,139 discloses a jet ink composition suitable for printing onto food items such as citrus fruits comprising Citrus Red No. 2 dye, at least one binder selected from the group consisting of rosin resins and cellulose derivatives, and a carrier comprising ethanol and acetone, wherein the ink composition is free of methyl ethyl ketone and water.

Many of the jet ink compositions heretofore known have some drawbacks. Some of the compositions employ solvents like methyl ethyl ketone which are not ideally suitable for use on food products. Some other compositions employ water soluble dyestuff which bleed when condensation occurred on the printed surface. Thus, for example, FD&C Blue #1 (C.I. No. 42090), a major colorant in making violet or blue citrus inks, is sensitive to water, and the printed image formed therefrom on citrus bleed when condensation occurs. This is true to varying degrees with all FD&C dyes due to their water solubility.

Further, some of the heretofore known water based ink compositions have the disadvantage of poor readability or opacity when printed on dark colored substrates such as candies. These ink compositions have the additional disadvantage that they dry very slowly, especially when printed on glazed candies such as shellac glazed candies. Long drying times reduce productivity and adversely affect the print quality due to the possibility of smudging.

The foregoing indicates that there is a need for a jet ink composition suitable for printing on food items such as chocolates, candies, fruits and vegetables.

There further exists a need for a jet ink composition that produces jet printed messages on fruits and vegetables such as lemons, oranges, limes, grapefruits, or other citrus, apples, and the like, that have condensation and moisture resistance and that do not bleed when exposed to moisture.

There further exists a need for jet ink compositions that are suitable for use on food items such as candies, particularly glazed candies, and pharmaceutical items such as tablets.

Further, there exists a need for jet ink compositions that are easy to prepare and are free or substantially free of sedimentation.

There also exists a need for ink jet ink compositions that dry fast and dry without smearing the print.

There also exists a need for ink jet ink compositions that offer increased line speed and allow printing large amount of information.

There also exists a need for ink jet ink compositions containing agents that provide improved film forming ability.

These and other objects and advantages of the present invention, as well as additional inventive features, will be apparent from the description of the invention provided herein.

SUMMARY OF THE INVENTION

The foregoing needs have been fulfilled to a great extent by the present invention which provides jet ink compositions suitable for printing messages on food items such as fruits, vegetables, and candies including chocolates and other confectioneries, and pharmaceuticals such as tablets, and other edible or ingestible materials.

The present invention provides a jet ink composition having short drying times comprising a surface modified or coated colorant and an ink carrier. The jet ink composition of the present invention offer excellent image adhesion, rub resistance, and are substantially free of sedimentation, even when aged at elevated temperatures.

The surface modified or coated food grade colorant of the present invention comprises a food grade colorant of particle size in the range of from about 0.01 micron to about 25 microns, a colorant carrier, and a surface modifying or coating agent. The surface modifying or coating agent comprises at least one binder resin, and preferably two or more binder resins.

The present invention further provides a process for preparing the surface modified or coated colorants as well as the jet ink compositions of the present invention. The present invention further provides a process of jet printing onto food and pharmaceutical articles. The present invention further provides food and pharmaceutical items which include marks printed thereon using the jet ink compositions of the present invention.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides jet ink compositions having short drying times that are suitable for printing on food items such as candies including chocolates and confectioneries, fruits and vegetables, and pharmaceutical articles such as tablets and pills.

The jet ink composition of the present invention comprises a surface modified or coated colorant, an ink carrier, and optionally other ingredients including ink binder resins and electrolytes. The ink carrier being volatile provides short ink drying times.

It has been found that the jet ink composition of the present invention can be advantageously prepared by first preparing a surface modified or coated colorant and then preparing the inventive jet ink composition using the surface modified or coated colorant. The surface modified or coated colorant permits the use of pigments in jet ink compositions where only dyes were usable previously. If the ink composition is prepared using the surface modified or coated colorant, the ink composition has greater stability and uniformity than an ink composition prepared by mixing the unmodified or uncoated colorant and the other ingredients including binder resins, and solvents, as practiced in conventional preparation of jet inks.

The jet ink composition of the present invention, in general, exhibits the following characteristics for use in ink jet printing systems: (1) a viscosity of from about 2 centipoises (cps) to about 10 cps at 25° C.; (2) an electrical resistivity of from about 1000 ohm-cm to about 1800 ohm-cm; and (3) a sonic velocity of from about 1200 meters/second to about 1700 meters/second.

In addition, for use on food and pharmaceutical articles, the ingredients chosen should use Generally Recognized as Safe (GRAS) ingredients as listed in 21 C.F.R. Sections 73, 172, 182, and 184.

The drying times of the jet ink of the present invention are below 2 minutes, preferably below about 30 seconds, and more preferably below about 10 seconds. The jet ink compositions are substantially free of sedimentation. For example, the jet ink composition remains free or substantially free of sedimentation when stored at 125° F. for several weeks, and at room temperature for longer periods of time.

A detailed discussion of each of the ingredients and a method of preparation of the jet ink composition of the present invention are set forth herein below.

SURFACE MODIFIED OR COATED COLORANT

The surface modified or coated colorant comprises a suitable colorant, a colorant carrier, and a surface modifying or coating agent. The surface modifying or coating agent comprises at least one binder resin and preferably two or more binder resins.

Any suitable colorant can be used. Examples of colorants suitable for human consumption include any colorant approved by the United States Food and Drug Administration (FDA) and meeting the specifications outlined in the Code of Federal Regulations, Title 21, Parts 73.575, 73.1575, and 73.2575, for titanium dioxide.

The colorant can be pigments including food grade or FD&C lakes. A Lake is a pigment formed by precipitation and absorption of a dye on an insoluble base or substrate. Lakes are extensions on a substratum such as alumina, of a salt prepared from one of the water-soluble straight colors by combining such color with the basic radical such as aluminum or calcium. Lakes are superior to dyes in that the lakes have greater heat and light stability compared to the dyes from which they were made. Additionally, lake pigments have improved water resistance than their FD&C dye counterparts.

A preferred substratum for the lakes is an alumina such as alumina hydrate. The lakes can have any suitable amount of dye associated with the substratum. The dye is present typically in an amount of up to about 45% by weight of the lake, and more commonly in an amount of from about 10% by weight of the lake to about 45% by weight of the Lake.

Examples of suitable lakes include lakes comprising dyes such as FD&C Blue #1, FD&C Blue #2, FD&C Green #3, FD&C Red #2, FD&C Red #3, FD&C Red #40, FD&C Yellow #5, and FD&C Yellow #6. The color additive FD&C Blue #1, is principally the disodium salt of ethyl[4-p-[ethyl (m-sulfobenzyl)amino]-a-(o-sulfophenyl)benzylidene)-2,5-cyclohexadien-1-ylidene](m-sulfobenzyl)ammonium hydroxide inner salt with smaller amounts of the isomeric disodium salts of ethyl[4-[p-[ethyl(p-sulfobenzyl)amino]-a-(o-sulfophenyl)benzylidene]-2,5-cyclohexadien-1-ylidene] (p-sulfobenzyl) ammonium hydroxide inner salt and ethyl [4-[p-[ethyl(o-sulfobenzyl)amino]-a-(o-sulfophenyl) benzylidene-2,5-cyclohexadien-1-ylidene](o-sulfobenzyl) ammonium hydroxide inner salt. For a description of the identity of the above other dyes, see 21 C.F.R. Part 74, pp. 326–363, Apr. 1, 1995.

Lakes are commercially available, for instance, from Warner-Jenkinson Co. ("WJ") in St. Louis, Mo. Thus, WJ's FD&C Blue #1 Lake has a dye content of 11–13% by weight of the Lake and FD&C Blue #1 Lake Concentrate has a dye content of 35–42% by weight of the Lake. WJ's FD&C Blue #2 Lake has a dye content of 12–14% by weight of the Lake and FD&C Blue #2 Lake Concentrate has a dye content of 35–42% by weight of the Lake. WJ's Erythrosine Lake has a dye content of 15–17% by weight of the Lake and Erythrosine Lake Concentrate has a dye content of 35–42% by weight of the Lake. WJ's FD&C Red #40 Lake has a dye content of 14–16% by weight of the Lake and FD&C Red #40 Lake Concentrate has a dye content of 35–42% by weight of the Lake. WJ's FD&C Yellow #5 Lake is available in two categories: one which has a dye content of 14–16% by weight of the Lake and the other has a dye content of 24–28% by weight of the Lake. WJ's FD&C Yellow #6 Lake has a dye content of 17–19% by weight of the Lake and FD&C Yellow #6 Lake Concentrate has a dye content of 35–42% by weight of the Lake. WJ's FD&C Yellow #10 Lake has a dye content of 15–21% by weight of the Lake and FD&C Red #40 Lake Concentrate has a dye content of 35–42% by weight of the Lake. The WJ Lakes and Lake Concentrates set forth above have an average particle size of less than 0.5 micron.

The colorant can have any suitable particle size, for instance, the particle size can range from about 0.01 micron to about 100 microns. It is preferred for use in ink jet printing purposes that the mean particle size is in the range of from about 0.01 micron to about 25 microns, more preferably from about 0.01 micron to about 5 microns, and even more preferably from about 0.01 micron to about 2 microns.

Any suitable amount of the colorant can be present in the surface modified or coated colorant. In some embodiments, for example, where a pigment such as titanium dioxide is used, the colorant is present preferably in an amount of from about 10% to about 70% by weight of the surface modified or coated colorant, and more preferably in an amount of from about 20% to about 60% by weight of the surface modified or coated colorant. In some other embodiments, for example, where a lake pigment is used, the colorant is present preferably in an amount of from about 10% to about 25% by weight of the surface modified or coated colorant, and more preferably in an amount of from about 15% to about 20% by weight of the surface modified or coated colorant.

In some embodiments of the present invention, a preferred colorant is titanium dioxide. Any suitable titanium dioxide, anatase or rutile, can be employed. Any suitable titanium dioxide that is commercially available can be employed. KOWET™ brand titanium dioxide is an example of a suitable commercially available titanium dioxide. It is a dense, white, water insoluble powder, has the anatase crystal structure and mean particle size of 0.3 microns mean and 1.0 microns maximum. KOWET brand titanium dioxide is available from Warner-Jenkinson Co.

The surface modified or coated colorant can be prepared by methods known to those of ordinary skill in the art. For example, it can be prepared by first dissolving the surface modifying or coating agent in a colorant carrier to obtain a solution of the surface modifying or coating agent, followed by dispersing the colorant in the solution.

Any suitable colorant carrier known to those of ordinary skill in the art can be used to prepare the surface modified or coated colorant. The carrier should have sufficient solubility for the surface modifying or coating agent. The carrier is preferably organic and has a low viscosity so as to allow easy mixing of the various components of the surface modified or coated colorant. Examples of suitable carriers include alcohols, ketones, and esters.

When the surface modified or coated colorant is to be used in a product designed for human or animal consumption, care should be taken by selecting carriers which are safe for such applications. Any carrier approved by the FDA for this purpose can be used. Particular examples of suitable carriers include ethanol, isopropanol, n-butyl alcohol, methylene chloride, ethylacetate, and cyclohexane, and the like. Ethanol is a preferred carrier. Denatured ethanol of about 190 to about 200 proof are further preferred.

It is further preferred that the colorant carrier is hydrophilic. Hydrogen bonding hydrophilic carriers are further preferred. Examples of suitable carriers include lower alcohols and water. The colorant carrier more preferably comprises a lower alcohol such as ethanol and isopropanol, in view of the hydrogen bonding ability of alcohols in general and the increased hydrogen bonding ability of lower alcohols in particular.

The colorant carrier is preferably free, or at least substantially free, of ketones such as methyl ethyl ketone, esters such as ethyl acetate, and halogenated solvents such as methylene chloride, in view of environmental concerns. However, if ketones, esters, or halogenated solvents are needed, their concentration is kept to a minimum level.

Any suitable amount of the carrier can be used in the preparation of the surface modified or coated colorant. In some embodiments, for example, where a pigment such as a lake is used as the colorant, the carrier is present preferably in an amount of from about 20% to about 85% by weight of the surface modified or coated colorant, and more preferably in an amount of from about 40% to about 60% by weight of the surface modified or coated colorant. The carrier may also contain more than one solvent. For example, a mixture of alcohol such as ethanol and water can be used. It is preferred that the proportion of the alcohol is greater than that of water. Thus, for example, ethanol can be present in an amount of from about 20% by weight to about 50% by weight of the surface modified or coated colorant, and water can be present in an amount of up to about 35% by weight of the surface modified or coated colorant.

In some other embodiments, for example, where a pigment such as titanium dioxide is used as the colorant, the carrier is present preferably in an amount of from about 35% to about 90% by weight of the surface modified or coated colorant, and more preferably in an amount of from about 50% to about 80% by weight of the surface modified or coated colorant.

The surface modified or coated colorant of the present invention comprises at least one binder resin, and preferably two or more binder resins. Examples of suitable binder resins include shellac, cellulosic resins, polyvinylpyrrolidone, and acidic resins. The binder resins are chosen carefully to combine the desired properties including printed image adhesion, rub resistance, and freedom from settling or pigment agglomeration.

Thus, in certain embodiments of the present invention, the surface modified or coated colorant comprises shellac as a surface modifying or coating agent. Shellac offers excellent print image adhesion and rub resistance.

Shellac has been known to man as a resinous coating material for a long time. Shellac, as the word is known and used today, refers to all forms of purified lac. Lac is the hardened resinous secretion of the tiny scale insect, Laccifer lacca (Kerr) of the super family Coccidae. The shellac may be of the hand-made, machine-made, or the bleached type.

Shellac contains only carbon, hydrogen, oxygen, and a negligible amount of ash. Elementary analysis yields carbon, 67.9%, hydrogen, 9.1%, and oxygen, 23.0%, which gives an empirical formula $C_4H_6O$. The molecular weight is about 1000. Using this molecular weight, an average shellac can be assigned a formula of $C_{60}H_{90}O_{15}$, and from its acid, saponification, and hydroxyl values, the molecule has been reported to contain one free acid group, three ester linkages, and five hydroxyl groups. There is evidence that it contains a free or potential carbonyl group. It is an acid resin with an ionization constant $K=1.8\times10^{-3}$. It is also known that at least one of the constituents of shellac has one unsaturated link (—C=C—).

The saponification value of bleached shellac is in the range of 230–260 mg KOH/g, the acid value is in the range of 73–95 mg KOH/g, the ester value is in the range of 150–180 mg KOH/g, the hydroxyl value is in the range of 230–260 mg KOH/g, and the iodine value is in the range of 7–12 decigram I/g.

Any suitable shellac can be used. It is preferred that a "refined" bleached shellac is used to prepare the ink concentrate of the present invention. "Refined" refers to the removal of the natural shellac wax, and thus a refined bleached shellac may have a low wax content of about 0.1–0.2% by weight, whereas a "regular" or unrefined bleached shellac may have a wax content of 4.0–5.5% by weight.

Any suitable commercially available shellac can be used to prepare the surface modified or coated colorant. An example of a suitable refined bleached shellac is the Certified R-49 Refined Bleached Shellac available from Montrose-Bradshaw-Zinsser Group in Westport, Conn. The above shellac is a free flowing, pale yellow, granular powder having an acid number of 91.0 mg KOH/g maximum, an ash content of 0.5% maximum, alcohol insolubles content of 0.2% maximum, total chlorides content of 0.2% maximum, free chlorides content of 0.1% maximum, a moisture content of 6.0% maximum, a wax content of 0.2% maximum, and a color rating (35% NV in alcohol) of 6 Gardner Standards maximum.

Any suitable amount of shellac can be used in the preparation of an embodiment of the surface modified or coated colorant. Shellac is present preferably in the range of from about 0.1% to about 35% by weight of the surface modified or coated colorant, and more preferably in the range of from about 2% to about 8% by weight of the surface modified or coated colorant.

The exact mechanism(s) by which shellac interacts with the colorant to provide the surface modified or coated colorant may not be fully understood. While intending not to be held to any particular theory or mechanism, the following is offered as a possible mechanism.

Commercial titanium dioxide usually contains some surface modifications. Thus, $TiO_2$ is modified with silica, alumina, or other materials such as phosphates, zinc oxide, and precipitated titania and organic coatings. These surface modifications are thought to be responsible for many of the surface characteristics of $TiO_2$. For example, organics have been reported to adsorb on $TiO_2$ surfaces, and the adsorption is in patches or on sites on $TiO_2$ surfaces rather than adsorbing uniformly. The number of active sites is estimated at about $10^8/cm^2$. These active sites are of distinctive types and each type of active site adsorbs one type of polar group.

It is believed that the colorant surface is surrounded by the shellac molecules. The hydroxyl, carboxyl, and ester groups of shellac are adsorbed, anchored, or bonded with the active sites on the hydrophilic surface of titanium dioxide. The excess or free hydroxyl, carboxyl, and carboxylic ester groups present in the shellac molecules may react with one another to produce a film around the surface of the titanium dioxide particle. The inter- and intra-esterification and/or transesterification may further cause the thermal polymerization of the shellac molecules. It is believed that the foregoing reactions may produce a film around the surface of the titanium dioxide particle. The excess or free hydroxyl, carboxyl, and carboxylic ester groups may in addition, interact with the organic solvent, for instance, with the hydroxyl group of alcohol by hydrogen bonding and/or by esterification. The hydrogen bonding solvent will solvate the shellac molecules and prevent the formation of shellac aggregates. The interaction between shellac and the solvent may be further responsible for the good dispersibility of the surface modified or coated colorant, for instance in dispersing in the ink medium. When binder resins are also employed to modify or coat the particle surface, it is believed that the shellac molecules interact with the binder resins to yield optimal surface modification or coating.

The surface modified or coated colorant prepared as above with a shellac as a surface modifying or coating agent may include one or more additional binder resins which act in various ways to offer improved surface properties to the colorant and the jet ink composition. For example, the additional binder resin may interact with the shellac to provide stability to the film formed on the surface of the colorant. It may act as a film plasticizer. It may also help in forming a good stable suspension of the surface modified or coated colorant when the latter is employed to prepare, for instance, an ink composition which is substantially sedimentation free even at elevated temperatures, e.g., at 125° F.

It is believed that in the surface modified or coated colorant, the colorant surface is surrounded by the shellac molecules. The hydroxyl, carboxyl, and ester groups of shellac are adsorbed, anchored, or bonded with the active sites of the hydrophilic surface of the colorant, particularly that of hydrated alumina. The excess or free hydroxyl, carboxyl, and carboxylic ester groups present in the shellac molecules may react with one another leading microencapsulation of each particle, and to the formation of a continuous film surrounding each particle. The inter- and intra-esterification and/or transesterification with the surface of the colorant may further cause the thermal polymerization of the shellac molecules. It is believed that the foregoing reactions further help produce a film enveloping the colorant particle. The excess or free hydroxyl, carboxyl, and carboxylic ester groups may in addition, interact with the hydrophilic carrier, for instance, with the hydroxyl group of alcohol by hydrogen bonding and by esterification. The hydrogen bonding solvent will solvate the shellac molecules and prevent the formation of shellac aggregates. The interaction between shellac and the carrier may be further responsible for achieving good dispersibility of the surface modified or coated colorant, for example, in dispersing in the ink medium. When an additional binder resin is employed in the preparation of the surface modified or coated colorant, it is believed that the shellac molecules interact with the colorant binder resins to yield optimal surface modification such as encapsulation, coating, or by increasing the flexibility of the coating or film surrounding the colorant particle.

Any suitable additional binder resin can be employed in the preparation of the surface modified or coated colorant wherein shellac is used as part of the surface modifying or coating agent. Examples of suitable binder resins include polyvinylpyrrolidone (PVP), polyvinylpyridine, polyamide polymers of linoleic acid with polyamines such as di, tri- and tetra- ethylene triamine, poly(N-vinyllactam) wherein the lactam is a 5, 6, or 7 membered ring, polyvinylalcohol, vinylalcohol/vinylacetate copolymers, N-vinyllactam/ vinylacetate copolymers wherein the lactam is a 5, 6, or 7 membered ring, vinylpyrrolidone-vinylacetate copolymers, cellulose ethers such as methylcellulose, ethylcellulose, hydroxyethylcellulose, hydroxypropylcellulose, hydroxypropyl methylcellulose, cellulose carboxylates such as sodium carboxymethylcellulose, cellulose esters such as cellulose acetate and cellulose acetate propionate, lecithin, arabic, karaya, tragacanth, xanthan, and alginate type gums, and the like. A preferred additional binder resin is hydroxypropyl methylcellulose.

The binder resin, when used in combination with shellac as described above, can be present in any suitable amount. Thus, for example, the binder resin can be present in an amount of up to 8% by weight and preferably in an amount of about 2% by weight of the surface modified or coated colorant.

Another embodiment of the surface modified or coated colorant of the present invention that comprises a surface modifying or coating agent made of two or more binder resins is described below. For example, when a lake pigment such as FD&C Blue #1 lake is used as the colorant, the pigment can be advantageously modified or coated with a combination of two resins, preferably a combination of an acidic resin and a cellulosic resin.

Any suitable acidic resin can be used as a binder resin. The acidic resin typically has an acid number of from about 20 mg KOH/g to about 200 mg KOH/g, and preferably from about 100 mg KOH/g to about 200 mg KOH/g, and more preferably from about 150 mg KOH/g to about 200 mg KOH/g. Examples of suitable acidic resins include rosin resins. Any suitable rosin resin, especially those which are soluble in ethanol, can be employed. The rosin resin is preferably a thermoplastic resin having a softening point in the range of from about 50° C. to about 120° C., and more preferably in the range of from about 70° C. to about 80° C.

Examples of rosin resins include gum rosins, tall oil rosins, and wood rosins, and hydrogenated resins thereof. Wood rosin resins are preferred, and hydrogenated wood rosin resins are further preferred. A high degree of hydrogenation is preferred because of the enhanced color stability of the hydrogenated resins. Thus the degree of unsaturation is kept low. For example, the abietic acid content is kept preferably below 1% by weight, and more preferably below 0.2%. Thus, FORAL AX™ is a preferred colorant binder resin and is available from Hercules, Inc. in Wilmington, Del. FORAL AX is a thermoplastic, acidic resin produced by hydrogenating wood rosin to a high degree. FORAL AX has a color of Xc (USDA rosin scale), a softening point of about 75° C. (Hercules drop method), an acid number of about 160 mg KOH/g, a refractive index of 1.4960 at 100° C., and an abietic acid content (UV) of 0.15%.

The rosin resins may be further derivatized. Such derivatives include glycerol esters of partially dimerized rosin, glycerol esters of hydrogenated gum or wood rosin, glycerol esters of polymerized rosin, and pentaerythritol esters of partially hydrogenated gum or wood rosin.

Any suitable cellulosic resin can be employed. Examples of cellulosic resins include cellulose ethers such as methylcellulose, ethylcellulose, hydroxyethylcellulose, hydroxypropylcellulose, hydroxypropyl methylcellulose, carboxylates such as sodium carboxymethylcellulose, and cellulose esters such as cellulose acetate and cellulose acetate propionate. Ethylcellulose is a preferred binder resin, particularly for use in combination with the acidic resin.

The surface modified or coated colorant can comprise the surface modifying or coating agent in any suitable amount. The agent is generally present in an amount of from about 0.5% by weight to about 45% by weight of the surface modified or coated colorant, preferably in an amount of from about 1% by weight to about 20% by weight of the surface modified or coated colorant, and more preferably in an amount of from about 2% by weight to about 10% by weight of the surface modified colorant.

Where the surface modifying or coating agent comprises more than one binder resin, any suitable combination of the amounts can be used. For example, where the agent comprises a cellulosic resin and an acidic resin, the cellulosic resin can be present in an amount of from about 0.5% by weight to about 20% by weight, and preferably in an amount of from about 1% by weight to about 10% by weight, of the surface modified or coated colorant, and the acidic resin can be present in an amount of from about 0.1% by weight to about 20% by weight and preferably in an amount of from about 0.5% to about 3% by weight of the surface modified or coated colorant.

The surface modified or coated colorant can be prepared by any suitable methods known to those of ordinary skill in the art. For example, the first binder resin, e.g., shellac, can be first dissolved in the carrier at a suitable temperature to bring about rapid dissolution. If necessary, a base such as ammonium hydroxide can be added as a stabilizer base. The temperature of mixing is generally in the range of from about 20° C. to about 60° C., and preferably in the range of from about 35° C. to 45° C. Any desired additional binder resin can then be added to the solution and mixed with dissolution is achieved. Optionally an electrolyte can be included in the above solution.

When the dissolution is complete, the solution is preferably mixed for another 5–10 minutes at an increased speed, preferably at a speed in the range of from about 800 rpm to 1200 rpm. A suitable amount of the colorant is then added slowly to the above solution. After the addition of the colorant is complete, the mixing speed is increased, preferably to about 2,000 rpm to about 5,000 rpm. The mixing is continued for a suitable period of time to obtain a smooth, uniformly mixed paste, preferably for a period of from about 20 minutes to about 40 minutes. In certain embodiments, for example, when FD&C lake pigments are used as the colorant, it is preferable to remove any dye loosely bound to the lake before it is surface modified or coated.

The above paste may be suitably diluted with a solvent and ground in a suitable mill such as ball mill. The ball milling operation assists in breaking up of any agglomerates and in producing a narrow particle size distribution of the surface modified or coated colorant.

Any suitable ball mill can be employed. For instance, a ball mill containing YTZ (yttria stabilized zirconia) beads of the diameter in the range of from about 0.4 mm to about 2.0 mm can be employed.

The surface modified or coated colorant prepared as above can be further dried to remove any free organic solvent. Free ethanol may be removed by any suitable means, e.g., under vacuum or under flowing air or nitrogen. The drying is preferably carried out at ambient temperature or below.

The surface modified or coated colorant such as the surface modified or coated titanium dioxide is valuable as ink concentrate for various reasons including the small particle size and narrow particle size distribution, and offers great opportunity for preparing pigmented white jet inks which are sedimentation free or substantially sedimentation free and safe for human consumption.

The surface modified or coated colorant, which generally has a paste like consistency, can be used as such in the preparation of a jet ink composition of the present invention suitable for printing on fruits and vegetables. It can be further processed to obtain a more homogeneous, clump free product having reduced particle size and narrow particle size distribution, by any suitable comminution means known to those of ordinary skill in the art such as ball milling. Thus, the product can be milled in a horizontal ball mill such as an Eiger Mini Motormill from Eiger Machinery, Inc. in Mundelein, Ill., using yttria-titania-zirconia (YTZ) beads of any suitable size, including a bead size of about 0.4 to about 2.0 mm. A preferred size of the beads is 0.6 mm.

The jet ink compositions of the present invention can be prepared using the surface modified or coated colorants and an ink carrier. Any suitable amount of the surface modified or coated colorant can be used to prepare the jet ink composition of the present invention. The surface modified or coated colorant is present preferably in the range of from about 10% to about 60% by weight of the jet ink composition, and more preferably in the range of from about 25% to about 35% by weight of the jet ink composition.

INK CARRIER

The jet ink composition of the present invention is prepared using a suitable ink carrier, which can be organic or aqueous solvent. An organic solvent is preferred. An organic solvent having low boiling point is preferred. Examples of suitable organic solvents include ethanol, iso-propanol, n-butanol, ethylacetate and the like. If desired, mixtures of solvents can be used. The jet ink composition of the present invention may contain water in addition to the aforesaid solvents. Thus, a mixture of ethanol and water can be used. Any suitable combination of solvent and water can be employed. It is preferable to use minor amounts of water. Excessive amounts of water will affect the stability of the jet ink composition and the ink drying times.

Any suitable amount of the ink carrier can be used in the preparation of the inventive surface jet ink composition. The carrier is present preferably in the range of from about 40% to about 90% by weight of the jet ink composition, and more preferably in the range of from about 60% to about 80% by weight of the jet ink composition. When water is used, in certain embodiments of the present invention, the amount of water is preferably below 15% by weight of the jet ink composition, and more preferably in the range of from about 8% to about 12% by weight of the jet ink composition. In some other embodiments of the present invention, e.g., where $TiO_2$ is used as the colorant, water is preferably present in an amount of below 25% by weight of the jet ink composition and more preferably in the range of from about 8% by weight to about 25% by weight of the jet ink composition.

INK BINDER RESIN

The jet ink compositions of the present invention may further include one or more ink binder resins. Any suitable binder resin can be used. Examples of binder resins suitable for food and pharmaceutical applications include shellac, cellulose ethers such as methylcellulose, ethylcellulose, hydroxyethylcellulose, hydroxypropylcellulose, hydroxypropylmethylcellulose, and sodium carboxymethylcellulose, cellulose esters such as cellulose acetate and cellulose acetate propionate, lecithin, arabic, karaya, tragacanth, xanthan, and alginate type gums, rosin resins, and the like. Shellac and PVP are examples of preferred binder resins. Shellac is commercially available as solutions in ethanol. These solutions are available as 2, 3, 4, 5, 6, 7, or 8 pound cut. The 4 pound cut solution, for example, contains 1,216 grams of shellac in 1 gallon of SDA-45 200 Proof ethyl alcohol. An example of a suitable PVP is the POVIDONE™ USP grade PVP from GAF Chemicals Corp. in Wayne, N.J.

Any suitable amount of the ink binder resin can be used in the preparation of the jet ink composition of the present invention. The ink binder resin is preferably present in the range of from above 0% to about 15% by weight of the jet ink composition, more preferably in the range of from about 1% to about 10% by weight of the jet ink composition. The amount of binder resin set forth in this paragraph does not include the amount of binder resins used to prepare the surface modified or coated colorant set forth earlier.

pH ADJUSTING AGENT

The ink composition of the present invention may in addition include a pH adjusting agent. Any suitable pH adjusting agent, acid or base, can be used so as to maintain the pH of the ink composition in the range of from about 4.5 to about 10.0, preferably in the range of from about 5.0 to about 9.0. If a base is necessary, any suitable base can be used. Examples of suitable bases include ammonium hydroxide, sodium hydroxide, potassium hydroxide, sodium bicarbonate, potassium bicarbonate, and ammonium bicarbonate. Although any suitable base can be used, it is preferred to make use of a base which can be eliminated by evaporation. Thus, it is preferable to use a base such as ammonium hydroxide for controlling the pH within the desired range.

Any suitable amount of the pH adjusting agent can be used. The pH adjusting agent is used preferably in an amount ranging from about 0.01% by weight to about 3.0% by weight of the ink composition.

ELECTROLYTE

The surface modified or coated colorant may optionally comprise one or more electrolytes to provide the optimal conductivity to the jet ink composition when the surface modified or coated colorant is used to prepare a jet ink composition. Any suitable electrolyte can be used. Any electrolyte generally recognized as safe (GRAS) for human consumption can be used. Examples of suitable electrolytes include the chloride, iodide, carbonate, bicarbonate, citrate, lactate, alginate, and hydroxide of sodium, potassium, ammonium, calcium, and magnesium. 21 C.F.R. § 184.1

The surface modified or coated colorant can comprise any suitable amount of the electrolyte, preferably up to about 4% by weight of the surface modified or coated colorant.

HUMECTANT

The ink composition of the present invention may in addition include a humectant to prevent drying of the ink during the printing operation, as well as during storage of the ink. Humectants are hydrophilic solvents having high boiling points, preferably above 100° C., and more preferably in the range of from about 150° C. to about 250° C. Any suitable humectant known to those of ordinary skill in the art can be used. An example of a suitable humectant is glycerin.

Any suitable amount of the humectant can be used, preferably in an amount of from about 0.5% by weight to about 5% by weight of the ink composition, and more preferably in the amount of from about 1% by weight to about 3% by weight of the ink composition.

BIOCIDE

The ink composition of the present invention may in addition include a suitable biocide to prevent growth of bacteria, mould or fungus, particularly when water is present in the ink composition. Any suitable biocide can be used. Benzoate salts, sorbate salts, and the like, and methyl p-hydroxybenzoate (Methyl Paraben) are examples of suitable biocides, with Methyl Paraben being a preferred biocide. The biocide can be present in the ink of the instant invention in an amount sufficient to prevent the attack by bacteria, mould, and fungus, which amount can be in the range of from about 0.05% by weight to about 0.5% by weight, preferably in the amount of from about 0.1% by weight of to about 0.3% by weight of the ink composition.

OTHER INGREDIENTS

The ink composition of the present invention may in addition comprise a defoamer to prevent foaming of the jet ink during its preparation, as well as during the printing operation. Any suitable food grade defoamer known to those of ordinary skill in the art can be used.

Any suitable amount effective to prevent foaming of the jet ink during preparation and use can be used, preferably an amount in the range of from about 0.01% by weight to about 1% by weight of the ink composition, and more preferably in the range of from about 0.05% by weight to about 0.35% by weight of the ink composition.

The jet ink composition or the surface modified or coated colorant of the present invention can further include other additives that improve one or more properties of the jet ink composition. For example, additives that improve the ability of the binder resins to form films of improved strength or durability, or that improve the water resistance of the printed image. Particular examples of additives include plasticizers and stabilizers. Stabilizers further improve the sedimentation properties of the surface modified or coated colorant or the jet ink composition. Examples of suitable additives include glyceryl monooleate (GMO), polyethylene glycol, and propylene glycol, with GMO being a preferred additive. The additives are preferably added to the jet ink composition. The additive can be present in any suitable amount, for example, in an amount of up to about 5% by weight and preferably in an amount of about 1% by weight of the jet ink composition.

The jet ink composition of the present invention can be prepared by any suitable method, for instance, by combining and mixing the necessary ingredients. The jet ink is preferably prepared as follows. The ink carrier containing the desired amounts of ethanol and water is prepared. The desired amount of the base is added to adjust the pH. The optional ink binder resin is then dissolved in the above solution. The solution is then added to a stirred surface modified or coated colorant, and mixing is continued until a well dispersed jet ink is obtained.

The following illustrative examples further illustrate the present invention but, of course, should not be construed as in any way limiting its scope.

EXAMPLE 1

This example illustrates a method of preparing an embodiment of the surface modified of coated colorant of the present invention.

The composition of the surface modified or coated colorant is set forth below.

| Ingredient | Wt. % |
| --- | --- |
| Ethanol (200 proof) | 40.0 |
| Hydroxypropyl methylcellulose (METHOCEL E3 Premium, Dow, 10% in 75% ethanol and 25% DI $H_2O$) | 2.0 |
| Deionized water | 12.7 |
| Ammonium hydroxide | 0.3 |
| Shellac solution (35% in 200 proof ethanol) | 5.0 |
| $TiO_2$ (KOWET) | 40.0 |
| | 100.0 |

The desired quantity of the shellac solution (#4 refined confectioner's glaze, MBZ) was mixed with a solution containing the desired quantities of ethanol, water, and ammonium hydroxide. To this solution was added the desired quantity of the hydroxypropyl methylcellulose solution and mixed in a reaction vessel equipped with a high shear mixer and a temperature controller and maintained at a constant temperature of about 40° C. The desired quantity of hydroxypropyl methylcellulose was added slowly maintaining a mixing speed of about 500 rpm. The mixing speed was increased to about 1,000 rpm and the desired quantity of titanium dioxide was added slowly. The contents of the vessel were then mixed at a mixer speed up to about 4,000 rpm for about 30 minutes while maintaining the temperature at about 40° C. The content of the vessel was then allowed to cool to ambient temperature and the resulting product was recovered. The product was ground in a horizontal media mill using YTZ beads of diameter 0.6 mm for about 20 minutes at 4,000 rpm, and the surface modified or coated titanium dioxide was obtained. The weight percentages of hydroxypropyl methylcellulose and shell listed above refer to the percentage of solids.

EXAMPLE 2

This example illustrates the preparation of an embodiment of the jet ink composition of the present invention using the surface modified or coated titanium dioxide prepared as in Example 1. Shellac was used as the ink binder resin.

| Ingredient | Wt. % |
|---|---|
| Surface Modified or Coated Colorant (Example 1) | 32.7 |
| Ethanol (200 Proof) | 43.0 |
| Deionized Water | 17.7 |
| Ammonium hydroxide | 0.8 |
| Shellac (solution) | 5.8 |
| | 100.0 |

The jet ink composition was prepared as follows.

Part A

Weighed quantities of ethanol and deionized water were taken in a container and mixed with a magnetic spin bar. The required quantity of ammonium hydroxide was added and mixed for about 5 minutes. The required quantity of shellac solution (#4 Refined Confectioner's Glaze) in 200 proof pure ethanol was added and mixed for about 15 minutes.

Part B

The required quantity of material from Part A was placed in a clean stainless steel vessel and mixed in a mixer.

The surface modified or coated colorant prepared as in Example 1 was added slowly to the solution in the stainless steel vessel keeping the contents continuously mixed. After the addition of the surface modified or coated colorant was complete, the speed was increased up to about 2000 rpm. The mixing was continued until a smooth ink composition was obtained.

EXAMPLE 3

This example illustrates the utility and the properties of the jet ink composition prepared as in Example 2 in jet printing on glazed candies.

A laboratory scale jet printing head was mounted so as to direct a stream of ink droplets at a conveyor belt. A series of M&M candies was placed on an adhesive tape to be individually held thereby and the taped candies were anchored to the conveyor belt. As the conveyor belt transported the candies by the print head, each candy was jet printed with the inventive ink composition. Subsequent to printing, the elapsed time before complete drying was monitored using a stop watch. The ink drying time was less than one second. A high quality print was obtained. No smearing or smudging was found.

EXAMPLE 4

This example illustrates the preparation of another embodiment of the surface modified or coated colorant of the present invention.

The following ingredients were used.

| Ingredient | Wt. % |
|---|---|
| SDA-3A (Specially Denatured Alcohol) | 71.9 |
| Ethylcellulose (ETHOCEL, DOW, 15% Solution in 200 proof SDA 3A) | 8.6 |
| FORAL AX (35% Solids in SDA 3A) | 2.0 |
| FD&C Blue #1 Lake Concentrate (WJ) | 17.5 |
| | 100.0 |

The FORAL AX resin was dissolved in SDA-3A to obtain a FORAL AX solution. Ethylcellulose was dissolved in SDA-3A and the solution was filtered. The ethylcellulose solution and the Floral AX solution were placed in a reaction vessel equipped with a high shear mixer and a temperature controller. The blue pigment was then added slowly and continuously over a period of 15 minutes to the resin solution at a temperature of about 35°–40° C. under a high speed mixing of approximately 2,000 rpm. The resulting paste was further mixed at the high speed for about 40 minutes at a temperature of about 40°–45° C. at 3,000–4,000 rpm. The resulting paste was placed in a Eiger horizontal media mill along with YTZ beads of 0.6 mm diameter and ball-milled to obtain a homogeneous paste of reduced particle size and substantially free of agglomerations. The surface modified or coated colorant was found to be useful in preparing a jet ink composition. The Wt. % of the ethylcellulose and FORAL AX resins set forth above refer to the percentages of the solids.

EXAMPLE 5

This example illustrates the preparation of an embodiment of the jet ink composition of the present invention using a surface modified or coated colorant of Example 4.

The following ingredients were used.

| Ingredient | Wt. % |
|---|---|
| SDA-3A specially denatured alcohol | 72.0 |
| 10% Ammonium Chloride (in water) | 3.0 |
| Surface modified or coated colorant from Example 4 | 25.0 |
| | 100.0 |

The ink composition was prepared by diluting a well stirred surface modified or coated colorant from Example 4 with the ethanol. The required quantity of ammonium chloride solution was then added and the mixing was continued at a speed of about 1000 rpm until a ink composition was obtained.

The resulting jet ink composition was successfully used to print messages on citrus fruits such as lemons and oranges. The citrus fruits were subjected to six cycles of transferring from a refrigerator to the room temperature atmosphere, and no bleeding of the message or any other degradation was observed.

EXAMPLE 6

This example illustrates the preparation of an embodiment of the jet ink composition of the present invention wherein a further additive is employed.

The following ingredients are used.

| Ingredient | Wt. % |
| --- | --- |
| SDA-3A specially denatured alcohol | 71.0 |
| 10% Ammonium Chloride (in water) | 3.0 |
| Glyceryl Monooleate | 1.0 |
| Surface modified or coated colorant from Example 4 | 25.0 |
| | 100.0 |

The ink composition is prepared by diluting a well stirred surface modified or coated colorant from Example 4 with the ethanol. The required quantities of ammonium chloride solution and glyceryl monooleate additive are then added, and the mixing is continued at a speed of about 1000 rpm until a smooth ink composition is obtained.

The jet ink composition of the present invention provides several advantages. The jet ink composition is relatively sedimentation free. The surface modified or coated colorants can be used in non-pigmented jet ink printers also to enhance the properties of the inks, for example, to increase the opacity.

The printed images dry relatively fast without smearing. Short drying times of the order of 2 seconds or less have been observed. The printed messages have good adhesion to the substrates and excellent rub resistance.

All of the references cited herein including patents, patent applications, and publications are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. A surface modified or coated food grade colorant comprising a food grade colorant of particle size of from about 0.01 micron to about 5 microns, a colorant carrier, and a surface modifying or coating agent, wherein said surface modified or coated food grade colorant is suitable for preparing a jet ink composition which is substantially sedimentation free.

2. The surface modified or coated food grade colorant of claim 1, wherein said surface modifying or coating agent comprises (i) shellac or (ii) a cellulosic resin and an acidic resin.

3. The surface modified or coated food grade colorant of claim 2, wherein said surface modifying or coating agent comprises a cellulosic resin and an acidic resin.

4. The surface modified or coated food grade colorant of claim 3, wherein said colorant is a lake of FD&C Blue #1.

5. The surface modified or coated food grade colorant of claim 4, wherein said carrier comprises an alcohol.

6. The surface modified or coated food grade colorant of claim 5, wherein said alcohol comprises ethanol.

7. The surface modified or coated food grade colorant of claim 6, wherein said cellulosic resin is ethylcellulose.

8. The surface modified or coated food grade colorant of claim 7, wherein said acidic resin is a rosin resin.

9. The surface modified or coated colorant of claim 8, wherein said rosin resin comprises a hydrogenated wood rosin resin.

10. The surface modified or coated food grade colorant of claim 2, wherein said surface modifying or coating agent comprises shellac.

11. The surface modified or coated colorant of claim 10, wherein said colorant is titanium dioxide.

12. The surface modified or coated colorant of claim 11, wherein said shellac is a refined bleached shellac.

13. The surface modified or coated food grade colorant of claim 12, wherein said carrier comprises an alcohol.

14. The surface modified or coated food grade colorant of claim 12, further comprising an additional binder resin.

15. The surface modified or coated food grade colorant of claim 14, wherein said additional binder resin is selected from the group consisting of methylcellulose, hydroxypropyl methylcellulose, and polyvinylpyrrolidone.

16. The surface modified or coated food grade colorant of claim 13, wherein said carrier further comprises water.

17. The surface modified or coated food grade colorant of claim 16, further comprising a stabilizer base.

18. A jet ink composition suitable for printing on food or pharmaceutical items comprising an ink carrier and the surface modified or coated colorant of claim 1.

19. A jet ink composition suitable for printing on food or pharmaceutical items comprising an ink carrier and the surface modified or coated colorant of claim 9.

20. A jet ink composition suitable for printing on food or pharmaceutical items comprising an ink carrier and the surface modified or coated colorant of claim 15.

21. The jet ink composition of claim 18, wherein said ink carrier comprises an alcohol.

22. The jet ink composition of claim 21, further comprising an electrolyte.

23. The jet ink composition of claim 22, wherein said ink carrier comprises ethanol.

24. The jet ink composition of claim 23, wherein said ink carrier further comprises water.

25. The jet ink composition of claim 24, further comprising an electrolyte.

26. The jet ink composition of claim 18, further comprising an additive selected from the group consisting of glyceryl monooleate, polyethylene glycol, and propylene glycol.

27. A method of preparing the surface modified or coated colorant of claim 15, comprising:
 (a) dissolving said shellac in said carrier;
 (b) dissolving said additional binder resin in the solution obtained in step (a);
 (c) adding a stabilizer base to the solution obtained in step (b); and
 (d) dispersing said titanium dioxide in the solution obtained in step (c).

28. A method of preparing the surface modified or coated colorant of claim 9, comprising:
 (a) dissolving said ethylcellulose in said colorant carrier;
 (b) dissolving said acidic resin in the solution obtained in step (a); and
 (d) dispersing said colorant in the solution obtained in step (b).

29. A process of jet ink printing on food or pharmaceutical items comprising projecting a stream of the jet ink composition of claim 18 onto said items and controlling the direction of the stream so that the droplets are caused to form the desired printed message on the surface of said items.

30. A surface modified or coated food grade colorant comprising a food grade titanium dioxide of particle size of from about 0.01 micron to about 5 microns, a colorant carrier, and a surface modifying or coating agent comprising a cellulosic resin.

31. The surface modified or coated food grade colorant of claim 30, wherein said cellulosic resin is selected from the group consisting of ethyl cellulose and hydroxypropyl cellulose.

32. A jet ink composition suitable for printing on food or pharmaceutical items comprising an ink carrier and the surface modified or coated colorant of claim 31.

\* \* \* \* \*